Dec. 9, 1958
J. T. STACY
2,863,816
NEUTRONIC REACTOR FUEL ELEMENT
Filed Oct. 21, 1955
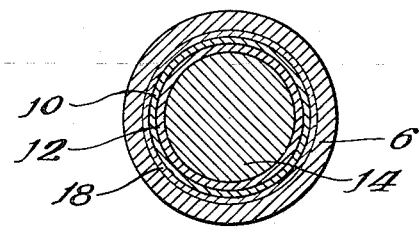
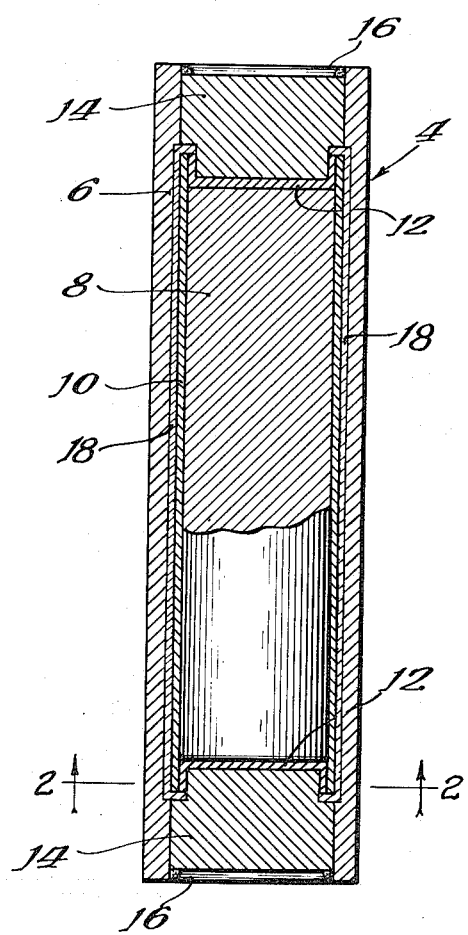
INVENTOR.
John T. Stacy
BY
Roland A. Anderson
Attorney.

2,863,816
NEUTRONIC REACTOR FUEL ELEMENT

John T. Stacy, Columbus, Ohio, assignor to the United States of America as represented by the United States Atomic Energy Commission Application October 21, 1955, Serial No. 542,119

11 Claims. (Cl. 204—193.2)

This invention relates to a fuel element for a neutronic reactor. More particularly it pertains to jacketing fuel elements of uranium for long service at high temperatures.

In order to increase the thermal efficiency of nuclear reactors it would be highly desirable to increase the operating temperature of the reactor core. One of the limiting factors which has prevented increased core temperatures has been the design of the fuel element, many of which use uranium slug or core bonded to an aluminum alloy jacket. While the uranium has a melting point of 1130° C. the aluminum has a melting point of only 660° C. All components of a fuel element should have a melting point approximating that of uranium. The melting point, however, is not the only criterion. The jacket must have a good corrosion resistance to the reactor coolant at the contemplated core temperature. The coolant may be a gas, such as helium or air, a liquid metal, such as sodium, or a hydrogenous liquid, such as water or diphenyl. Furthermore, the fuel element must be creep resistant during the alternate heating and cooling cycles such as occur during start-up and shut-down of a reactor. Because of these considerations a fuel element suitable for high temperature should be capable of enduring exposure to air for 100 hours at about 1000° C. and be capable of withstanding 50 thermal cycles between 90° C. and 1000° C. It is an object of the present invention to provide such a fuel element.

The present invention is concerned with the fuel element per se rather than with the operation of a particular reactor in which it functions; the incorporation of the element into existing reactors is well within the skill of the art. The element may be used in reactors such as are disclosed in U. S. Patent 2,708,656, "Neutronic Reactor," E. Fermi et al. The element is particularly suitable for use in fast reactors such as are disclosed in copending applications Serial No. 721,108 of Walter H. Zinn, filed January 8, 1947, and Serial No. 437,017 of Walter H. Zinn, filed June 15, 1954, now Patent No. 2,841,545, granted July 1, 1958.

For better understanding of the invention, reference is made to the drawings in which:

Figure 1 is a vertical sectional view of this invention; and

Figure 2 is a horizontal sectional view taken on the line 2—2 of Figure 1.

The all-metal fuel element under consideration is shown in Figure 1 and is generally indicated at 4. It is composed of three principal parts: an outside jacket 6 for strength and oxidation resistance, a core 8, and a barrier coat or sleeve 10 between the jacket and the core. Each open end of the barrier sleeve 10 is closed with a cup-shaped cap 12 composed of the same material as the sleeve. The open ends of the jacket 6 are also closed with end plugs 14 of similar material that are press-fitted into place. Each plug 14 is retained by a circular weld at 16 between the plug and the jacket 6. This assures the existence of a fluid-tight seal during the period when the fuel element 4 is in the neutronic reactor.

Considering the parts in the order named, the jacket 6 serves the purposes of supporting the element 4 and protecting it from corrosion while operating at temperatures near 1090° C. over a period of at least 100 hours. Those alloys possessing suitable strength and oxidation resistance for such high-temperature service contain two or more of the following elements: chromium, cobalt, nickel and iron. Several high-temperature alloys are available which possess appreciable strength and oxidation resistance at the prescribed conditions. Notable among these are the stainless steels, the preferred type having 25% chromium and 20% nickel. With this type of alloy the jackets may be fabricated into drawn tubing with wall thickness 0.010 inch to 0.020 inch. In order to use jacketing of these thicknesses, the core 8 must be dimensionally stable throughout the temperature ranges involved. Inasmuch as pure uranium does not meet this qualification, a uranium alloy must be used. It has been found that a molybdenum-uranium alloy core containing 5 to 10% by weight of molybdenum, preferably 7 to 10%, is dimensionally stable or nearly so under the thermal cycling set forth above. When pure uranium is used as the core material, this dimensionally unstable metal penetrates the barrier coat 10 during exposure at high temperatures or on thermal cycling, and such penetration results in early failure of the jacket 6. The isotopic content of the uranium core is not important, as regards the physical characteristics of the core, and any isotopic mixture of uranium may be used in the core.

The purpose of the barrier coat or sleeve 10 is to prevent the formation of low melting alloys between the core 8 and the jacket 6. Each of the elements (chromium, cobalt, nickel and iron in the jacket) forms a eutectic with uranium having a melting point several hundred degrees below that of pure uranium. Consequently, if the fuel element 4 is to be exposed for any length of time above 750° to 850° C., the jacket must be separated from the core by a barrier coat to prevent the formation of low melting uranium alloys. For this purpose, the core 8 could be enclosed in a barrier coat comprised of tantalum, molybdenum, columbium, tungsten or silver. The first four of these are useful at high temperatures, i. e. 1090° C., whereas silver is only useful up to its melting point, about 940° C. The optimum thickness of the barrier coat 6 has been found to vary with different barrier materials as follows: tungsten, 0.0025 in.; tantalum, 0.005 in.; molybdenum, 0.01 in.; columbium, 0.01 in.; and silver, 0.02–0.06 in. For a core having a cylindrical configuration, the metals tungsten and tantalum have proved to be ideal barrier metals. However, in view of the difficulty involved in working tungsten, the softer tantalum is more amenable to fabrication. Tantalum in thicknesses under 0.005 in. was found to prevent interdiffusion between uranium and alloys suitable for jacketing for more than 100 hours at 1090° C. The other metals, namely tungsten, molybdenum and columbium, are equally good to cover the core.

Several processes may be employed to secure a satisfactory barrier coat. These involve seamless tubes, metal foil, electrodeposition, spraying and dipping. Of these, the use of the drawn seamless tantalum tubing met with the greatest success, such tubing having a thickness of 0.005 in. and an inside diameter of 0.37 in. The use of tubing permits the core to be turned to a diameter such that a close sliding fit can be attained. In addition, the tantalum is ductile enough to permit upsetting of the core to secure an even tighter fit on assembly. The problem of closing the ends of the tubing was satisfactorily solved by the use of small cup-shaped tantalum caps 12. These caps were inserted into the tantalum barrier tube or sleeve 10 so that the base of the cap contacted the core 8. The side walls of the cap 12 were held against the inside of the barrier tube 10 by the inner profile of the stainless steel end plugs 14. Good contact between the cap 12 and the barrier tube 10 was insured by drawing the cap with a diameter slightly greater than the inside diameter of said tube. An optional filling of a metal such as thallium or silver which will become liquid at the operating temperature of the reactor may be used as a thermal bond to fill the interstices between slug, barrier and jacket. Such a bond 13 is illustrated in Figures 1 and 2.

Various metallic foils were also used as barrier coats. However, considerable difficulty was encountered in applying the foil to the ends of the cylindrical core 8. For these reasons, use of the foil was found to be less satisfactory than the seamless tube type barrier.

One of the most desirable methods of applying a barrier coat to a cylindrical core of a fuel element is by electrodeposition. At the present time, however, it is not possible to electroplate appreciable thicknesses of the better barrier materials, for example, tungsten, tantalum and molybdenum. However, an electroplated silver barrier was found to function satisfactorily on a uranium core for 100 hours at temperatures somewhat below its melting point, for example 940° C. Above this temperature the silver barrier would not function as a solid, thereby preventing diffusion between the core 8 and the jacket 6.

Barrier coatings applied by spraying or dipping proved unsatisfactory in that they tended to spall.

During the reaction within a neutronic reactor, a fuel element such as the one here involved will generate heat due to the fission of the uranium core. For this reason the barrier coat or sleeve 10 is tight-fitting about the core 8 and the jacket 6 fits tightly about said coat. Manifestly, the existence of a void space between the several parts of the assembly will reduce the efficiency of the transfer of the heat from the core to the outer surface of the jacket. Where such spaces occur, it is contemplated that a metal filler be disposed in them. By filling any such space or interstice between the parts, the metal serves to increase the thermal conductivity or heat transfer rate. Two metals were used experimentally, namely, silver and thallium. Although silver was originally employed because of its excellent barrier properties in the solid state, it was later found that uranium was much less soluble in thallium at or above 900° C. Consequently, later work was directed predominantly to the thallium filler.

Other variations from the preferred methods and examples described will be apparent and may be made without departing from the spirit and scope of the invention.

What is claimed is:

1. A fuel element for a neutronic reactor comprising a cylindrical core of a molybdenum-uranium alloy containing 7 to 10% by weight molybdenum, a tight-fitting jacket of stainless steel on the core, and a barrier coat interposed between the core and the jacket, said coat being a metal of the group consisting of tungsten, tantalum, molybdenum, columbium and silver.

2. A fuel element for a neutronic reactor comprising a cylindrical core of a molybdenum-uranium alloy containing 5 to 10% by weight molybdenum, a tight-fitting jacket containing about 25% chromium, 20% nickel and 55% iron on the core, and a barrier coat interposed between the core and the jacket, said coat being a metal of the group consisting of tungsten, tantalum, molybdenum, columbium and silver.

3. A fuel element for a neutronic reactor comprising a cylindrical core of a molybdenum-uranium alloy containing 5 to 10% by weight molybdenum, a tight-fitting jacket containing about 25% chromium, 20% nickel, and 55% iron on the core, and a barrier coat interposed between the core and the jacket, said coat consisting of 0.005-inch tantalum.

4. A fuel element for a neutronic reactor comprising a cylindrical core of a molybdenum-uranium alloy containing 5 to 10% by weight molybdenum, a tight-fitting jacket containing about 25% chromium, 20% nickel, and 55% iron on the core, and a barrier coat interposed between the core and the jacket, said coat consisting of 0.0025-inch tungsten.

5. A fuel element for a neutronic reactor comprising a cylindrical core of a molybdenum-uranium alloy containing 5 to 10% by weight molybdenum, a tight-fitting jacket containing about 25% chromium, 20% nickel, and 55% iron on the core, and a barrier coat interposed between the core and the jacket, said coat consisting of 0.01-inch molybdenum.

6. A fuel element for a neutronic reactor comprising a cylindrical core of a molybdenum-uranium alloy containing 5 to 10% by weight molybdenum, a tight-fitting jacket containing about 25% chromium, 20% nickel, and 55% iron on the core, and a barrier coat interposed between the core and the jacket, said coat consisting of 0.01-inch columbium.

7. A fuel element for a neutronic reactor comprising a cylindrical core of a molybdenum-uranium alloy containing 5 to 10% by weight molybdenum, a tight-fitting jacket containing about 25% chromium, 20% nickel, and 55% iron on the core, and a barrier coat interposed between the core and the jacket, said coat consisting of 0.02–0.06-inch silver.

8. A fuel element for a neutronic reactor comprising a cylindrical core of a molybdenum-uranium alloy containing 5 to 10% by weight molybdenum, a tight-fitting barrier sleeve about the core, a cap within the open ends of the sleeve, said sleeve and caps consisting essentially of a metal of the group consisting of tungsten, tantalum, molybdenum, columbium and silver, a tight-fitting jacket around the sleeve, a second cap within the open ends of the jacket in a fluid-tight manner, said jacket and second cap containing about 25% chromium, 20% nickel, and 55% iron.

9. A fuel element for a neutronic reactor comprising a cylindrical core of a molybdenum-uranium alloy containing 5 to 10% by weight molybdenum, a tight-fitting barrier sleeve about the core, a cap within the open ends of the sleeve, said sleeve and caps consisting essentially of tantalum, a tight-fitting jacket around the sleeve, and a second cap within the open ends of the jacket in a fluid-tight manner, said jacket and second cap containing about 25% chromium, 20% nickel, and 55% iron.

10. A fuel element for a neutronic reactor comprising a cylindrical core of a molybdenum-uranium alloy containing 5 to 10% by weight molybdenum, a barrier sleeve about the core, a cap within the open ends of the sleeve, said sleeve and cap consisting essentially of tantalum, a jacket around the sleeve, a second cap within the open ends of the jacket in a fluid-tight manner, said jacket and second cap containing about 25% chromium, 20% nickel, and 55% iron, and a silver filler disposed in such places where the core, sleeve and jacket are separated.

11. A fuel element for a neutronic reactor comprising a cylindrical core of a molybdenum-uranium alloy containing 5 to 10% by weight molybdenum, a barrier sleeve about the core, a cap within the open ends of the sleeve, said sleeve and cap consisting essentially of tantalum, a jacket around the sleeve, a second cap within the open ends of the jacket in a fluid-tight manner, said jacket and second cap containing about 25% chromium, 20% nickel, and 55% iron, and a thallium filler disposed in such places where the core, sleeve and jacket are separated.

(References on following page)

References Cited in the file of this patent

UNITED STATES PATENTS 1,759,454    Heany ---------------- May 20, 1930

OTHER REFERENCES

ANL-5030, U. S. Atomic Energy Comm., April 14, 1953, p. 6.

The Reactor Handbook, vol. 2, Engineering, declassified edition, Atomic Energy Comm., May 1955, pp. 451-460.

Principles of Nuclear Reactor Engineering, by Samuel Glasstone, D. Van Nostrand Co., New York, 1st edition, July 1955, pp. 765, 766.

Proceedings of the International Conference on the Peaceful Uses of Atomic Energy, vol. 9; held in Geneva August 8-20, 1955, United Nations, New York, 1956, pp. 179-183.